United States Patent
Tang et al.

(10) Patent No.: US 10,097,466 B2
(45) Date of Patent: Oct. 9, 2018

(54) DATA DISTRIBUTION METHOD AND SPLITTER

(71) Applicant: HUAWEI TECHNOLOGIES CO., LTD., Shenzhen (CN)

(72) Inventors: Jiyuan Tang, Shenzhen (CN); Bin Huang, Hangzhou (CN); Keping Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 77 days.

(21) Appl. No.: 15/190,774

(22) Filed: Jun. 23, 2016

(65) Prior Publication Data

US 2016/0308771 A1    Oct. 20, 2016

Related U.S. Application Data

(63) Continuation of application No. PCT/CN2014/094180, filed on Dec. 18, 2014.

(30) Foreign Application Priority Data

Dec. 24, 2013  (CN) .......................... 2013 1 0721545

(51) Int. Cl.
*H04L 12/803* (2013.01)
*H04L 12/10* (2006.01)
(Continued)

(52) U.S. Cl.
CPC ............ *H04L 47/125* (2013.01); *H04L 12/10* (2013.01); *H04L 45/745* (2013.01);
(Continued)

(58) Field of Classification Search
CPC . H04L 47/125; H04L 47/193; H04L 47/6255; H04L 45/745; H04L 47/2483;
(Continued)

(56) References Cited

U.S. PATENT DOCUMENTS 6,483,804 B1    11/2002  Muller et al.
8,005,916 B2 *   8/2011  Pope ..................... G06F 13/10
                                                      709/212
(Continued)

FOREIGN PATENT DOCUMENTS

CN       101217467 A    7/2008
CN       101656677 A    2/2010
(Continued)

OTHER PUBLICATIONS

Chinese Office Action dated Jul. 19, 2017 in corresponding Chinese Patent Application No. 201310721545.7.
(Continued)

*Primary Examiner* — Phong La
(74) *Attorney, Agent, or Firm* — Staas & Halsey LLP

(57) ABSTRACT

A data distribution method and a splitter is provided. The data distribution method executed by the splitter includes: parsing a received data packet to determine a transport layer communications protocol to which the data packet belongs; acquiring from the data packet, identification information of a data stream to which the received data packet belongs; acquiring from a memory according to a correspondence between a transport layer communications protocol and an distribution table, an distribution table corresponding to the transport layer communications protocol to which the data packet belongs; determining according to a correspondence between identification information of a data stream and a thread in the acquired distribution table, a thread corresponding to the data stream to which the data packet belongs; and sending the data packet to a cache queue of the determined thread, so that the determined thread acquires the data packet from the cache queue.

18 Claims, 4 Drawing Sheets

(51) Int. Cl.
    *H04L 29/08*     (2006.01)
    *H04L 12/851*     (2013.01)
    *H04L 12/861*     (2013.01)
    *H04L 12/741*     (2013.01)
    *H04L 12/801*     (2013.01)
    *H04L 12/863*     (2013.01)
    *H04L 29/06*     (2006.01)
    *G06F 9/54*     (2006.01)

(52) U.S. Cl.
    CPC ........ *H04L 47/193* (2013.01); *H04L 47/2483* (2013.01); *H04L 47/6255* (2013.01); *H04L 49/90* (2013.01); *H04L 67/1027* (2013.01); *H04L 67/2842* (2013.01); *H04L 69/22* (2013.01); *H04L 69/326* (2013.01); *G06F 9/544* (2013.01)

(58) Field of Classification Search
    CPC ....... H04L 12/10; H04L 28/10; H04L 69/326; H04L 67/1027; H04L 67/2842
    See application file for complete search history.

(56) References Cited

U.S. PATENT DOCUMENTS

| | | | |
|---|---|---|---|
| 8,190,960 B1* | 5/2012 | Bahadur | H04L 12/56 714/748 |
| 8,838,817 B1* | 9/2014 | Biswas | H04L 45/38 709/230 |
| 2003/0037147 A1* | 2/2003 | Matsubayashi | G06F 9/546 709/227 |
| 2003/0182624 A1* | 9/2003 | Large | G06F 17/3089 715/205 |
| 2005/0018689 A1* | 1/2005 | Chudoba | H04L 29/06 370/395.5 |
| 2005/0086393 A1 | 4/2005 | Meng et al. | |
| 2005/0201540 A1* | 9/2005 | Rampey | G10L 15/22 379/142.14 |
| 2006/0031571 A1* | 2/2006 | Banerjee | H04L 63/08 709/238 |
| 2007/0115982 A1* | 5/2007 | Pope | H04L 45/742 370/392 |
| 2007/0289014 A1 | 12/2007 | Pyo et al. | |
| 2009/0296685 A1 | 12/2009 | O'Shea et al. | |
| 2010/0057932 A1* | 3/2010 | Pope | H04L 69/16 709/236 |
| 2010/0232438 A1* | 9/2010 | Bajpai | H04L 69/16 370/400 |
| 2011/0296007 A1 | 12/2011 | Liu et al. | |
| 2012/0113992 A1* | 5/2012 | Zhao | H04W 4/005 370/431 |
| 2012/0226804 A1* | 9/2012 | Raja | H04L 43/028 709/224 |
| 2012/0230341 A1 | 9/2012 | Mital et al. | |
| 2013/0089109 A1 | 4/2013 | Mital et al. | |
| 2013/0138920 A1* | 5/2013 | Ge | H04L 47/2441 712/30 |
| 2013/0346987 A1* | 12/2013 | Raney | G06F 9/5044 718/102 |
| 2015/0039763 A1* | 2/2015 | Chaudhary | H04L 47/125 709/226 |

FOREIGN PATENT DOCUMENTS

| | | |
|---|---|---|
| CN | 101699788 A | 4/2010 |
| CN | 101867558 A | 10/2010 |
| CN | 102377640 A | 3/2012 |
| CN | 102497430 A | 6/2012 |
| CN | 102664815 A | 9/2012 |
| CN | 102811169 A | 12/2012 |
| CN | 102821165 A | 12/2012 |
| EP | 1 478 127 A1 | 11/2004 |

OTHER PUBLICATIONS

Zhang Huihui, "Implementation of User Space Parallel TCP/IP Stack" Beijing University of Posts and Telecommunication, Beijing 100876, Nov. 2010, pp. 1-6.
Extended European Search Report dated Nov. 3, 2016 in corresponding European Patent Application No. 14875040.9.
International Search Report dated Feb. 17, 2015 in corresponding International Patent Application No. PCT/CN2014/094180.
Marian et al., "NetSlices: Scalable Multi-Core Packet Processing in User-Space", ANCS'12, TX, USA, Oct. 2012, pp. 1-12.
Thekkath et al., "Implementing Network Protocols at User Level", 1993, pp. 1-11.
Pope et al., "OpenOnload a user-level network stack", OpenOnload, SOLARFLARE Communication, 2012, pp. 1-100.
International Search Report dated Feb. 17, 2015, in corresponding International Application No. PCT/CN2014/094180.

* cited by examiner

DATA DISTRIBUTION METHOD AND SPLITTER

CROSS-REFERENCE TO RELATED APPLICATION

This application is a continuation of International Application No. PCT/CN2014/094180, filed on Dec. 18, 2014, which claims priority to Chinese Patent Application No. 201310721545.7, filed on Dec. 24, 2013, both of which are hereby incorporated by reference in their entireties.

TECHNICAL FIELD

The present disclosure relates to the field of computer technologies, and in particular, to a data distribution method and a splitter.

BACKGROUND

Nowadays, a processor has stepped into a multi-core era, and in a multi-core architecture, parallel processing is generally implemented in a manner of deploying multiple threads in multiple cores, which then requires to send data packets to different threads in an distribution manner, so as to implement parallel processing of the multiple cores.

In an existing data distribution method, a process is used as an distribution granularity, that is, a data packet is sent to a cache queue of a process corresponding to the data packet. A thread in the process acquires the data packet from the cache queue of the process, and connection information of the data packet may be shared by another thread. If the connection information of the data packet is shared by another thread, when the thread accesses the connection information corresponding to the data packet, an inter-thread exclusion and synchronization mechanism is needed to ensure consistent access to data. If another thread is accessing the connection information exactly at this moment, the thread needs to keep waiting for accessing the connection information until the another thread completes the access.

Therefore, the existing data distribution method has the following disadvantages: Multiple threads share a cache queue of a same process, which will cause a large quantity of inter-thread exclusion and synchronization overheads, and an inter-core cache failure, so that a processing capability of a multi-core processor cannot be sufficiently exploited.

SUMMARY

In view of this, embodiments of the present disclosure provide a data distribution method and a splitter, so as to improve a processing capability of a multi-core processor.

In a first aspect, an embodiment of the present disclosure provides a data distribution method that is applied to a data distribution system, where the data distribution system includes a splitter, a memory, and multiple threads used for processing data, and each thread corresponds to a cache queue; the memory stores a correspondence between a transport layer communications protocol and an distribution table, and stores an distribution table corresponding to each transport layer communications protocol, and each distribution table is provided with a correspondence between identification information of a data stream and a thread; and the method includes:

parsing, by the splitter, a received data packet to determine a transport layer communications protocol to which the data packet belongs;

acquiring, by the splitter from the data packet, identification information of a data stream to which the data packet corresponding to the determined transport layer communications protocol belongs, where the identification information of the data stream is used to differentiate the data stream to which the data packet belongs;

acquiring, by the splitter from the memory according to the correspondence between a transport layer communications protocol and an distribution table, an distribution table corresponding to the transport layer communications protocol to which the data packet belongs;

determining, by the splitter according to the correspondence between identification information of a data stream and a thread in the distribution table corresponding to the transport layer communications protocol to which the data packet belongs, a thread corresponding to the data stream to which the data packet belongs; and sending, by the splitter, the data packet to a cache queue of the thread corresponding to the data stream, so that the thread corresponding to the data stream acquires the data packet from the cache queue.

In a first possible implementation manner of the first aspect, if the transport layer communications protocol to which the data packet belongs is a connectionless-oriented transport layer communications protocol, the identification information of the data stream is a 2-tuple of the data packet, and the 2-tuple includes a destination IP address and port of the data packet; and the distribution table corresponding to the connectionless-oriented transport layer communications protocol includes a correspondence between a 2-tuple and a thread identifier, where each thread identifier corresponds to one thread.

With reference to the first possible implementation manner of the first aspect, in a second possible implementation manner, the determining, by the splitter according to the correspondence between identification information of a data stream and a thread in the distribution table corresponding to the transport layer communications protocol to which the data packet belongs, a thread corresponding to the data stream to which the data packet belongs includes: searching, by the splitter, the correspondence between a 2-tuple and a thread identifier in the distribution table corresponding to the connectionless-oriented transport layer communications protocol to which the data packet belongs, for a thread identifier corresponding to the 2-tuple of the data packet; and determining, by the splitter, a thread corresponding to the thread identifier that corresponds to the 2-tuple of the data packet as the thread corresponding to the data stream to which the data packet belongs.

In a third possible implementation manner of the first aspect, if the transport layer communications protocol to which the data packet belongs is a connection-oriented transport layer communications protocol, the identification information of the data stream is a 4-tuple of the data packet, and the 4-tuple includes a source IP address, a source port, a destination IP address, and a destination port of the data packet; the distribution table corresponding to the connection-oriented transport layer communications protocol includes a first distribution table and a second distribution table; the first distribution table includes a correspondence between a 4-tuple and a thread identifier, where each thread identifier corresponds to one thread; and the second distribution table includes a correspondence between a thread identifier and a destination IP address and port, where each thread identifier corresponds to one thread and a load of each thread; where threads corresponding to a destination IP address and port are threads in different processes.

With reference to the third possible implementation manner of the first aspect, in a fourth possible implementation manner, the determining, by the splitter according to the correspondence between identification information of a data stream and a thread in the distribution table corresponding to the transport layer communications protocol to which the data packet belongs, a thread corresponding to the data stream to which the data packet belongs includes: searching, by the splitter, the correspondence between a 4-tuple and a thread identifier in the first distribution table corresponding to the connection-oriented transport layer communications protocol to which the data packet belongs, for a thread identifier corresponding to the 4-tuple of the data packet; if the thread identifier corresponding to the 4-tuple of the data packet exists in the first distribution table, determining, by the splitter, a thread corresponding to the thread identifier that corresponds to the 4-tuple of the data packet as the thread corresponding to the data stream to which the data packet belongs; or if the thread identifier corresponding to the 4-tuple of the data packet does not exist in the first distribution table, searching, by the splitter, the correspondence between a thread identifier and a destination IP address and port in the second distribution table corresponding to the connection-oriented transport layer communications protocol to which the data packet belongs, for a thread identifier or thread identifiers corresponding to the destination IP address and port of the data packet; and determining, by the splitter, a thread with a smallest load in a thread or threads corresponding to the thread identifier or thread identifiers that corresponds/correspond to the destination IP address and port of the data packet as the thread corresponding to the data stream to which the data packet belongs.

With reference to the first possible implementation manner of the first aspect, the second possible implementation manner of the first aspect, the third possible implementation manner of the first aspect, or the fourth possible implementation manner of the first aspect, in a fifth possible implementation manner, the thread identifier is an address of a cache queue corresponding to a thread.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, the method further includes: updating, by the splitter, the distribution table according to a state of a thread.

In a second aspect, an embodiment of the present disclosure provides a splitter that is applied to a data distribution system, where the data distribution system further includes a memory and multiple threads used for processing data, and each thread corresponds to a cache queue; the memory stores a correspondence between a transport layer communications protocol and an distribution table, and each distribution table is provided with a correspondence between identification information of a data stream and a thread; and the splitter includes:

a parsing unit, configured to parse a received data packet to determine a transport layer communications protocol to which the data packet belongs;

a first acquiring unit, configured to acquire, from the data packet, identification information of a data stream to which the data packet corresponding to the determined transport layer communications protocol belongs, where the identification information of the data stream is used to differentiate the data stream to which the data packet belongs;

a second acquiring unit, configured to acquire, from the memory according to the correspondence between a transport layer communications protocol and an distribution table, an distribution table corresponding to the transport layer communications protocol to which the data packet belongs;

a determining unit, configured to determine, according to the correspondence between identification information of a data stream and a thread in the distribution table corresponding to the transport layer communications protocol to which the data packet belongs, a thread corresponding to the data stream to which the data packet belongs; and a sending unit, configured to send the data packet to a cache queue of the thread corresponding to the data stream, so that the thread corresponding to the data stream acquires the data packet from the cache queue.

In a first possible implementation manner of the second aspect, if the transport layer communications protocol to which the data packet belongs is a connectionless-oriented transport layer communications protocol, the identification information of the data stream is a 2-tuple of the data packet, and the 2-tuple includes a destination IP address and port of the data packet; and the distribution table corresponding to the connectionless-oriented transport layer communications protocol includes a correspondence between a 2-tuple and a thread identifier, where each thread identifier corresponds to one thread.

With reference to the first possible implementation manner of the second aspect, in a second possible implementation manner, the determining unit is specifically configured to: search the correspondence between a 2-tuple and a thread identifier in the distribution table corresponding to the connectionless-oriented transport layer communications protocol to which the data packet belongs, for a thread identifier corresponding to the 2-tuple of the data packet; and determine a thread corresponding to the thread identifier that corresponds to the 2-tuple of the data packet as the thread corresponding to the data stream to which the data packet belongs.

In a third possible implementation manner of the second aspect, the distribution table corresponding to the connection-oriented transport layer communications protocol includes a first distribution table and a second distribution table; the first distribution table includes a correspondence between a 4-tuple and a thread identifier, where each thread identifier corresponds to one thread; and the second distribution table includes a correspondence between a thread identifier and a destination IP address and port, where each thread identifier corresponds to one thread and a load of each thread; where threads corresponding to a destination IP address and port are threads in different processes.

With reference to the third possible implementation manner of the second aspect, in a fourth possible implementation manner, the determining unit is specifically configured to: search the correspondence between a 4-tuple and a thread identifier in the first distribution table corresponding to the connection-oriented transport layer communications protocol to which the data packet belongs, for a thread identifier corresponding to a 4-tuple of the data packet; if the thread identifier corresponding to the 4-tuple of the data packet exists in the first distribution table, determine a thread corresponding to the thread identifier that corresponds to the 4-tuple of the data packet as the thread corresponding to the data stream to which the data packet belongs; or if the thread identifier corresponding to the 4-tuple of the data packet does not exist in the first distribution table, search the correspondence between a thread identifier and a destination IP address and port in the second distribution table corresponding to the connection-oriented transport layer communications protocol to which the data packet belongs, for a thread identifier or thread identifiers corresponding to a destination IP address and port of the data packet; and determine a thread with a smallest load in a thread or threads corresponding to the thread identifier or thread identifiers that corresponds/correspond to the destination IP address and port of the data packet as the thread corresponding to the data stream to which the data packet belongs.

With reference to the first possible implementation manner of the second aspect, the second possible implementation manner of the second aspect, the third possible implementation manner of the second aspect, or the fourth possible implementation manner of the second aspect, in a fifth possible implementation manner, the thread identifier is an address of a cache queue corresponding to a thread.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner, the splitter further includes an updating unit, configured to update the distribution table according to a state of a thread.

According to the foregoing solutions, the splitter uses a thread as an distribution granularity, and different transport layer communications protocols correspond to different distribution tables; the splitter allocates, according to an distribution table corresponding to a transport layer communications protocol to which a data packet belongs, the data packet to a cache queue of a thread corresponding to a data stream to which the data packet belongs, so that the thread acquires the data packet from the cache queue corresponding to the thread. Because each thread has its independent cache queue, the data packet and connection information of the data packet are not shared by multiple threads, which can avoid inter-thread exclusion and synchronization overheads, avoid an inter-core cache failure, thereby improving a processing capability of a multi-core processor.

DESCRIPTION OF EMBODIMENTS

To make the objectives, technical solutions, and advantages of the present disclosure clearer, the following further describes the present disclosure in detail with reference to the accompanying drawings. Apparently, the described embodiments are merely some but not all of the embodiments of the present disclosure. All other embodiments obtained by a person of ordinary skill in the art based on the embodiments of the present disclosure shall fall within the protection scope of the present disclosure.

Figure 1:
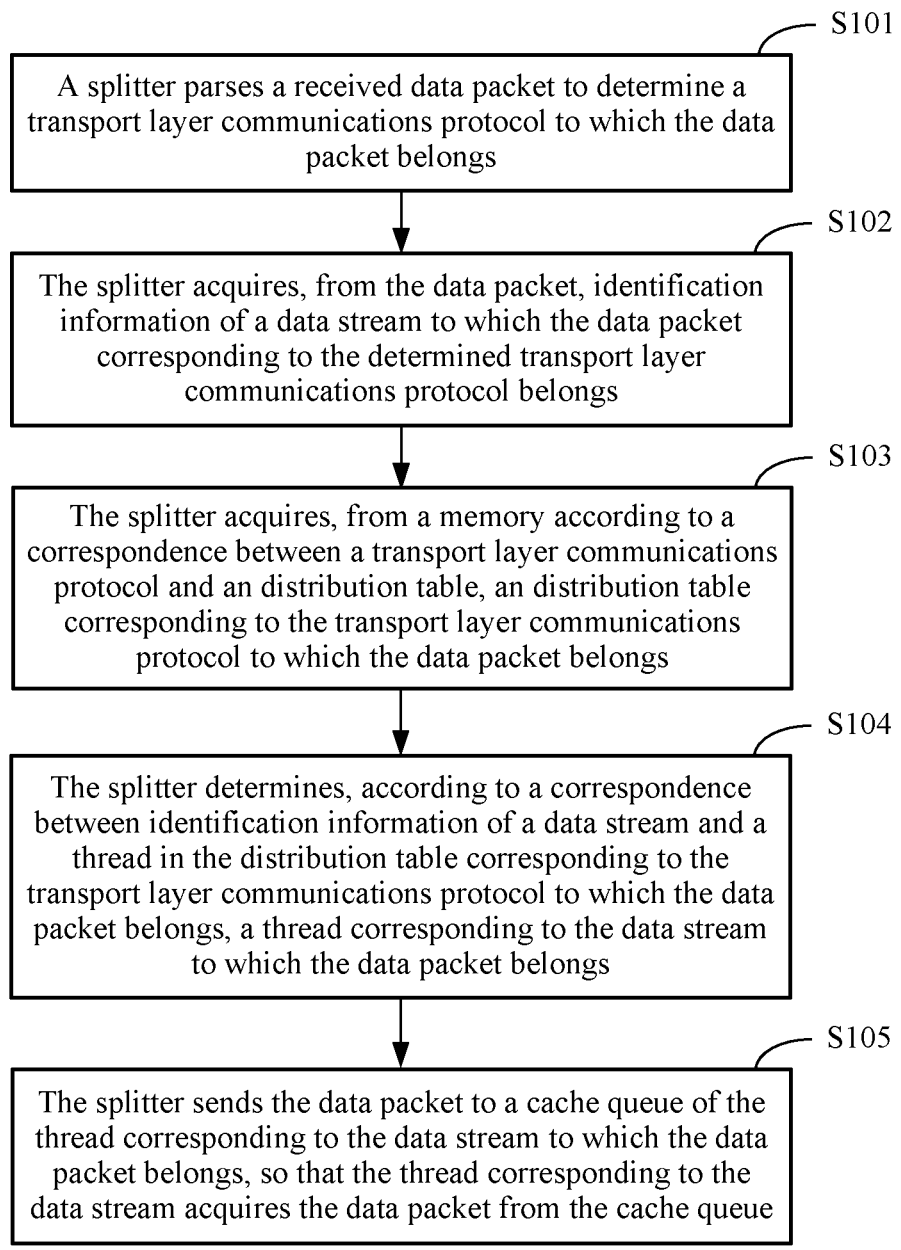
FIG. 1 is a schematic flowchart of a data distribution method according to Embodiment 1 of the present disclosure.

The following uses FIG. 1 as an example to describe in detail a data distribution method provided in Embodiment 1 of the present disclosure. FIG. 1 is a schematic flowchart of a data distribution method according to Embodiment 1 of the present disclosure. The data distribution method is applied to a data distribution system, where the data distribution system includes a splitter, a memory, and multiple threads used for processing data, and each thread corresponds to a cache queue. The memory is configured to store a correspondence between a transport layer communications protocol and an distribution table, and store an distribution table corresponding to each transport layer communications protocol, and each distribution table is provided with a correspondence between identification information of a data stream and a thread. The memory may comprise a high-speed RAM memory, also may comprise a non-volatile memory such as at least one magnetic disk memory. The data distribution method provided in this embodiment is executed by the splitter. As shown in FIG. 1, the data distribution method includes the following steps:

Step S101: The splitter parses a received data packet to determine a transport layer communications protocol to which the data packet belongs.

After the splitter receives the data packet, if the data packet is a complete data packet or a first segment of a complete data packet, the splitter may learn, from a header of the data packet, the transport layer communications protocol to which the data packet belongs. If the data packet is a segment of a complete data packet but not the first segment of the complete data packet, the splitter searches for the first segment of the complete data packet according to an IP header of the data packet. If the splitter has not received the first segment of the complete data packet, the splitter needs to wait until the splitter receives the first segment of the complete data packet. After obtaining the first segment of the complete data packet by searching, the splitter learns, from a header of the first segment, the communications protocol to which the data packet belongs.

There are two types of transport layer communications protocols: One is a connectionless-oriented transport layer communications protocol and the other is a connection-oriented transport layer communications protocol. The connectionless-oriented transport layer communications protocol may be specifically the User Datagram Protocol (UDP), and the connectionless-oriented transport layer communications protocol may be specifically the Transmission Control Protocol (TCP) and the Stream Control Transmission Protocol (SCTP).

Step S102: The splitter acquires, from the data packet, identification information of a data stream to which the data packet corresponding to the determined transport layer communications protocol belongs, where the identification information of the data stream is used to differentiate the data stream to which the data packet belongs.

If the transport layer communications protocol to which the data packet belongs is a connectionless-oriented transport layer communications protocol, the identification information of the data stream is a 2-tuple of the data packet, where the 2-tuple includes a destination IP address and port of the data packet, and the splitter acquires the 2-tuple of the data packet from the data packet.

If the transport layer communications protocol to which the data packet belongs is a connection-oriented transport layer communications protocol, the identification information of the data stream is a 4-tuple of the data packet, where the 4-tuple includes a source IP address, a source port, a destination IP address, and a destination port of the data packet, and the splitter acquires the 4-tuple of the data packet from the data packet.

Step S103: The splitter acquires, from the memory according to a correspondence between a transport layer communications protocol and an distribution table, an distribution table corresponding to the transport layer communications protocol to which the data packet belongs.

Figure 2:
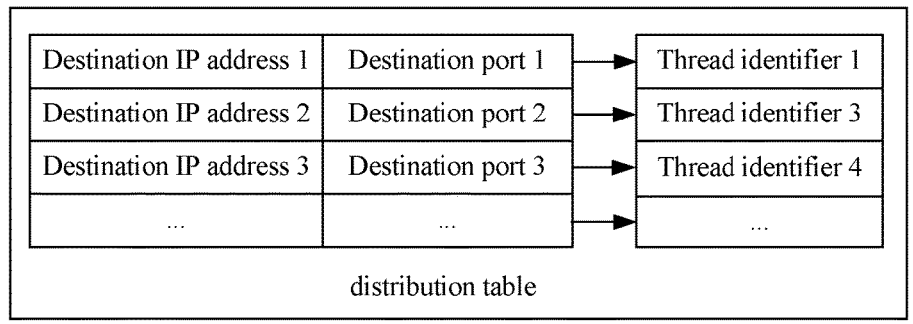
FIG. 2 is a schematic diagram of an distribution table according to Embodiment 1 of the present disclosure.

Optionally, as shown in FIG. 2, if the transport layer communications protocol to which the data packet belongs is a connectionless-oriented transport layer communications protocol, the distribution table includes a correspondence between a 2-tuple and a thread identifier, where each thread identifier corresponds to one thread, and the thread identifier may be an identity number ID of a thread, an address of a cache queue corresponding to a thread, or another identifier that can uniquely determine a thread.

Figure 3:
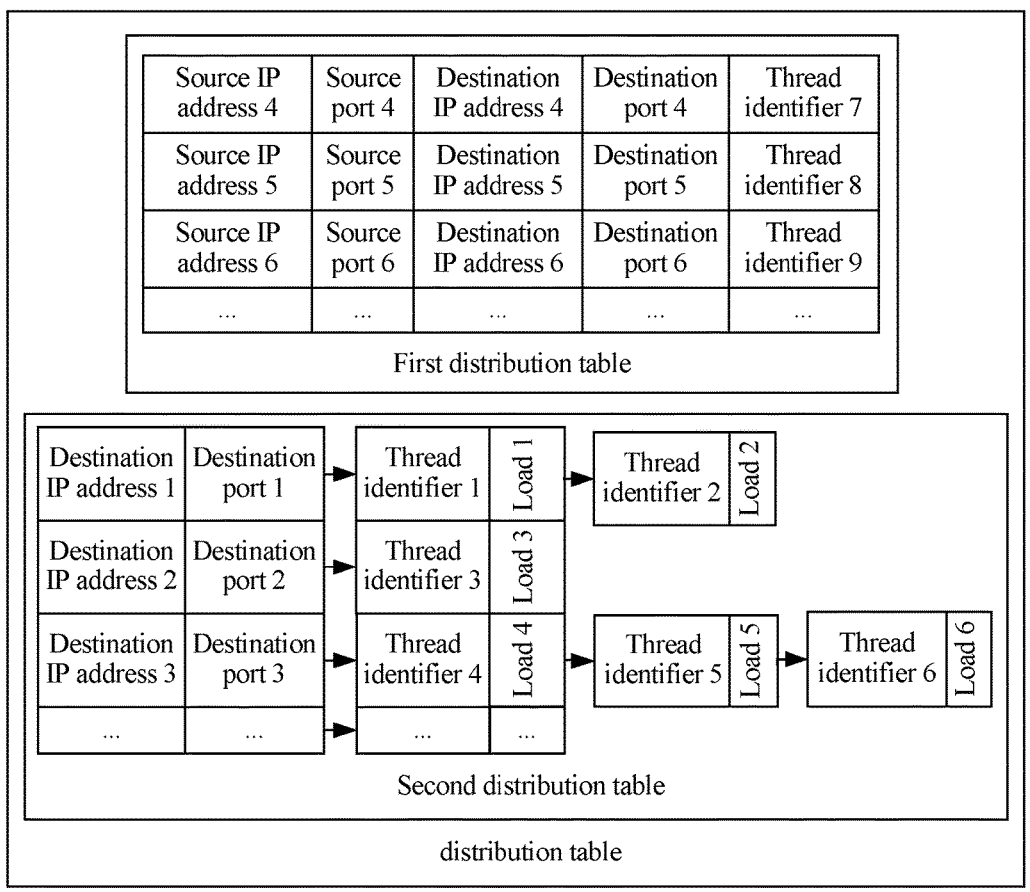
FIG. 3 is a schematic diagram of another distribution table according to Embodiment 1 of the present disclosure.

Optionally, as shown in FIG. 3, if the transport layer communications protocol to which the data packet belongs is a connection-oriented transport layer communications protocol, the distribution table includes a first distribution table and a second distribution table. The first distribution table includes a correspondence between a 4-tuple and a thread identifier, where each thread identifier corresponds to one thread; the second distribution table includes a correspondence between a thread identifier and a destination IP address and port, where each thread identifier corresponds to one thread and a load of each thread. Multiple threads corresponding to a destination IP address and port are threads in different processes, so as to implement that threads in different processes are bound to the destination IP address and port of a same set. The thread identifier may be an identity number ID of a thread, an address of a cache queue corresponding to a thread, or another identifier that can uniquely determine a thread.

Step S104: The splitter determines, according to a correspondence between identification information of a data stream and a thread in the distribution table corresponding to the transport layer communications protocol to which the data packet belongs, a thread corresponding to the data stream to which the data packet belongs.

Figure 4:
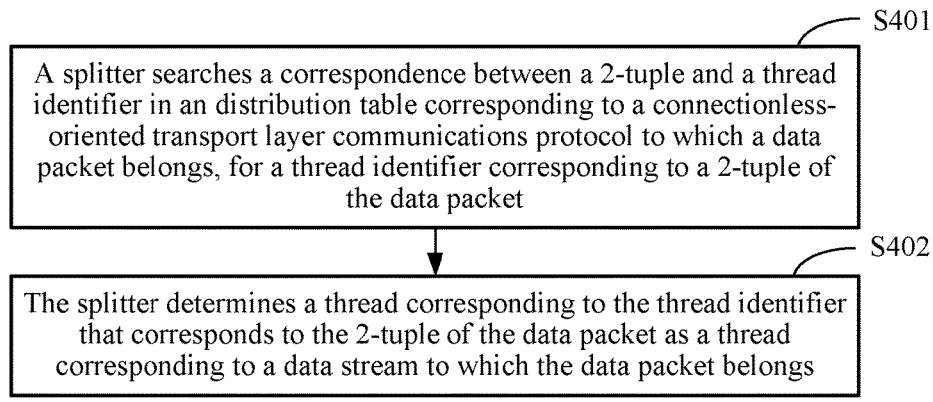
FIG. 4 is a schematic flowchart of a method for determining a thread corresponding to a data stream to which a data packet belongs according to Embodiment 1 of the present disclosure.

Optionally, when the transport layer communications protocol to which the data packet belongs is a connectionless-oriented communications protocol, the thread corresponding to the data stream to which the data packet belongs is determined according to the distribution table shown in FIG. 2. As shown in FIG. 4, a process of determining, according to the distribution table shown in FIG. 2, the thread corresponding to the data stream to which the data packet belongs includes the following steps:

Step S401: The splitter searches a correspondence between a 2-tuple and a thread identifier in the distribution table corresponding to the connectionless-oriented transport layer communications protocol to which the data packet belongs, for a thread identifier corresponding to a 2-tuple of the data packet.

Step S402: The splitter determines a thread corresponding to the thread identifier that corresponds to the 2-tuple of the data packet as the thread corresponding to the data stream to which the data packet belongs.

It can be learned from the distribution table shown in FIG. 2 that, a set of a destination IP address and port correspond to only one thread identifier. Therefore, after determining that the only thread identifier corresponding to the 2-tuple of the data packet exists in the distribution table, the splitter directly determines the thread corresponding to the thread identifier as the thread corresponding to the data stream to which the data packet belongs.

Figure 5:
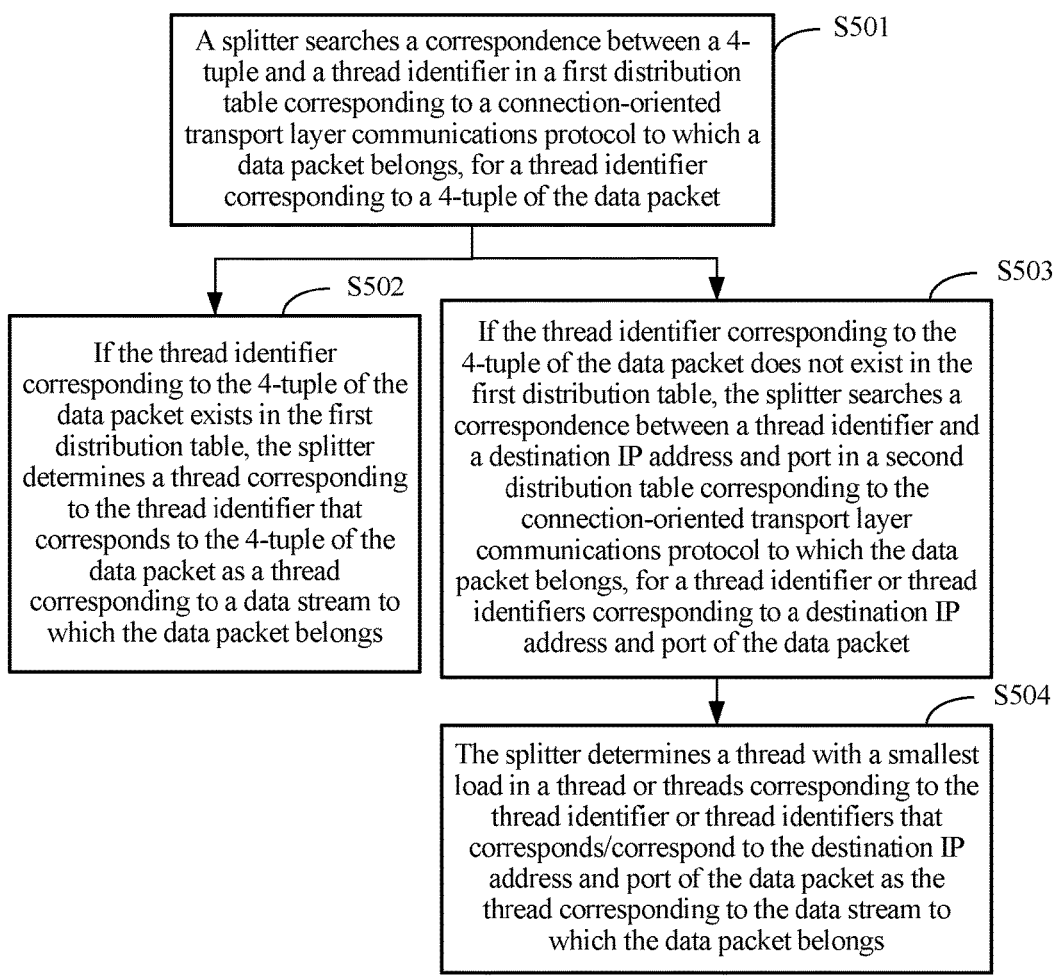
FIG. 5 is a schematic flowchart of another method for determining a thread corresponding to a data stream to which a data packet belongs according to Embodiment 1 of the present disclosure.

Optionally, when the transport layer communications protocol to which the data packet belongs is a connection-oriented communications protocol, the thread corresponding to the data stream to which the data packet belongs is determined according to the distribution table shown in FIG. 3. As shown in FIG. 5, a process of determining, according to the distribution table shown in FIG. 3, the thread corresponding to the data stream to which the data packet belongs includes the following steps:

Step S501: The splitter searches a correspondence between a 4-tuple and a thread identifier in the first distribution table corresponding to the connection-oriented transport layer communications protocol to which the data packet belongs, for a thread identifier corresponding to a 4-tuple of the data packet.

The first distribution table of the distribution table shown in FIG. 3 is searched for the thread identifier corresponding to the 4-tuple of the data packet. If the thread identifier corresponding to the 4-tuple of the data packet exists in the first distribution table, step S502 is performed. If the thread identifier corresponding to the 4-tuple of the data packet does not exist in the first distribution table, step S503 and step S504 are performed.

Step S502: If the thread identifier corresponding to the 4-tuple of the data packet exists in the first distribution table, the splitter determines a thread corresponding to the thread identifier that corresponds to the 4-tuple of the data packet as the thread corresponding to the data stream to which the data packet belongs.

It can be learned from the first distribution table of the distribution table shown in FIG. 3 that, a set of a source IP address, a source port, a destination IP address, and a destination port correspond to only one thread identifier. Therefore, after determining that the only thread identifier corresponding to the 4-tuple of the data packet exists in the first distribution table, the splitter directly determines the thread corresponding to the thread identifier as the thread corresponding to the data stream to which the data packet belongs.

Step S503: If the thread identifier corresponding to the 4-tuple of the data packet does not exist in the first distribution table, the splitter searches a correspondence between a thread identifier and a destination IP address and port in the second distribution table corresponding to the connection-oriented transport layer communications protocol to which the data packet belongs, for a thread identifier or thread identifiers corresponding to the destination IP address and port of the data packet.

Step S504: The splitter determines a thread with a smallest load in a thread or threads corresponding to the thread identifier or thread identifiers that corresponds/correspond to the destination IP address and port of the data packet as the thread corresponding to the data stream to which the data packet belongs.

It can be learned from the distribution table shown in FIG. 3 that, each thread identifier in the second distribution table corresponds to a load of a thread corresponding to the thread identifier. If the destination IP address and port of the data packet correspond to only one thread identifier in the second distribution table of the distribution table shown in FIG. 3, a thread corresponding to the thread identifier is directly determined as the thread corresponding to the data stream to which the data packet belongs. If the destination IP address and port of the data packet correspond to multiple thread identifiers in the second distribution table of the distribution table shown in FIG. 3, a thread with a smallest load in threads corresponding to the multiple thread identifiers is determined as the thread corresponding to the data stream to which the data packet belongs, so as to implement load balancing among threads and make loads of a multi-core processor balanced.

Step S105: The splitter sends the data packet to a cache queue of the thread corresponding to the data stream to which the data packet belongs, so that the thread corresponding to the data stream acquires the data packet from the cache queue.

After determining, according to the distribution table, the thread corresponding to the data stream to which the data packet belongs, the splitter sends the data packet to the cache queue of the thread corresponding to the data stream to which the data packet belongs. Then the thread directly acquires the data packet from the cache queue corresponding to the thread; therefore, the data packet is not shared by multiple threads, which can avoid inter-thread exclusion and synchronization overheads, and avoid failure of an inter-core cache.

In addition, the data distribution method provided in Embodiment 1 of the present disclosure may further include the following steps:

Update the distribution table according to a state of a thread.

Specifically, for the distribution table shown in FIG. 2, when a thread establishes a connection, a thread identifier corresponding to the thread that establishes the connection, and a destination IP address and port corresponding to the thread are added to the distribution table. When a thread corresponding to a thread identifier in the distribution table changes from a connected state to an idle state (the idle state in this embodiment indicates that in a case in which a thread is not closed, a connected state of the thread is disabled or a connected state of the thread is abnormally interrupted), the thread identifier corresponding to the thread that changes from the connected state to the idle state, and a destination IP address and port corresponding to the thread are deleted from the distribution table.

For the distribution table shown in FIG. 3, when a thread corresponding to a thread identifier in the first distribution table changes from a connected state to a listening state, the thread identifier of the thread, and a source IP address, a source port, a destination IP address, and a destination port that correspond to the thread are deleted from the first distribution table; the thread identifier of the thread, and the destination IP address and port corresponding to the thread, and a load of the thread are added to the second distribution table. When a thread corresponding to a thread identifier in the second distribution table changes from a listening state to a connected state, the thread identifier of the thread, a destination IP address and port corresponding to the thread, and a load of the thread are deleted from the second distribution table; the thread identifier of the thread, and a source IP address, a source port, the destination IP address, and the destination port that correspond to the thread are added to the first distribution table. When a thread changes from an idle state to a listening state, a thread identifier corresponding to the thread that changes from the idle state to the listening state, a destination IP address and port corresponding to the thread, and a load of the thread are added to the second distribution table. When a thread corresponding to a thread identifier in the first distribution table or the second distribution table changes to an idle state, the thread identifier of the thread that changes to the idle state, and a source IP address, a source port, a destination IP address, and a destination port that correspond to the thread are deleted from the first distribution table; or the thread identifier corresponding to the thread that changes to the idle state, a destination IP address and port corresponding to the thread, and a load of the thread are deleted from the second distribution table.

According to the used data distribution method provided in Embodiment 1 of the present disclosure, the splitter uses a thread as an distribution granularity, and different transport layer communications protocols correspond to different distribution tables; the splitter allocates, according to an distribution table corresponding to a transport layer communications protocol to which a data packet belongs, the data packet to a cache queue of a thread corresponding to a data stream to which the data packet belongs, so that the thread acquires the data packet from the cache queue corresponding to the thread. Because each thread has its independent cache queue, the data packet and connection information of the data packet are not shared by multiple threads, which can avoid inter-thread exclusion and synchronization overheads, and avoid failure of an inter-core cache. In addition, for a connection-oriented transport layer communications protocol, it is implemented that multiple threads listen on a same port, which can effectively balance loads among multiple cores, and improve a processing capability of a multi-core processor.

Figure 6:
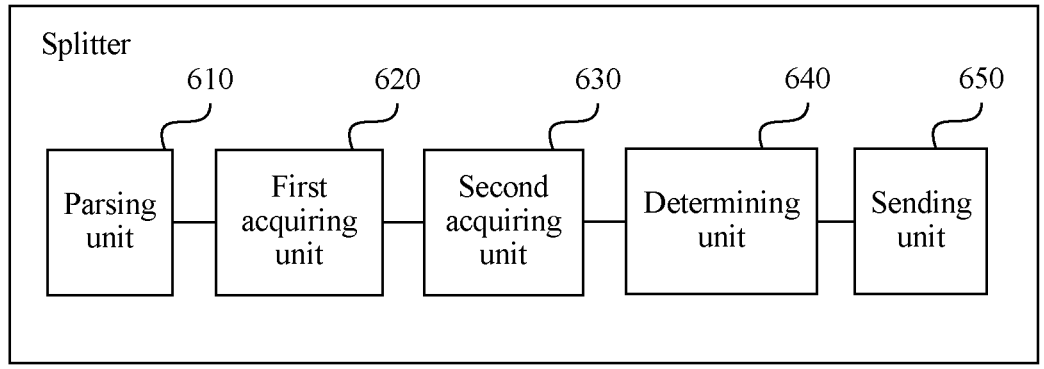
FIG. 6 is a schematic structural diagram of a splitter according to Embodiment 2 of the present disclosure.

The following uses FIG. 6 as an example to describe in detail a splitter provided in Embodiment 2 of the present disclosure. FIG. 6 is a schematic structural diagram of a splitter according to Embodiment 2 of the present disclosure. The splitter is applied to a data distribution system and configured to implement the data distribution method provided in Embodiment 1 of the present disclosure. The data distribution system further includes a memory and multiple threads used for processing data, and each thread corresponds to a cache queue. The memory is configured to store a correspondence between a transport layer communications protocol and an distribution table, and store an distribution table corresponding to each transport layer communications protocol, and each distribution table is provided with a correspondence between identification information of a data stream and a thread. The memory may comprise a high-speed RAM memory, also may comprise a non-volatile memory such as at least one magnetic disk memory.

As shown in FIG. 6, the splitter includes a parsing unit 610, a first acquiring unit 620, a second acquiring unit 630, a determining unit 640, and a sending unit 650.

The parsing unit 610 is configured to parse a received data packet to determine a transport layer communications protocol to which the data packet belongs.

After the splitter receives the data packet, if the data packet is a complete data packet or a first segment of a complete data packet, the parsing unit 610 may learn, from a header of the data packet, the transport layer communications protocol to which the data packet belongs. If the data packet is a segment of a complete data packet but not the first segment of the complete data packet, the parsing unit 610 searches for the first segment of the complete data packet according to an IP header of the data packet. If the splitter has not received the first segment of the complete data packet, the splitter needs to wait until the splitter receives the first segment of the complete data packet. After obtaining the first segment of the complete data packet by searching, the parsing unit 610 learns, from a header of the first segment, the communications protocol to which the data packet belongs.

There are two types of transport layer communications protocols: One is a connectionless-oriented transport layer communications protocol and the other is a connection-oriented transport layer communications protocol. The connectionless-oriented transport layer communications protocol may be specifically the UDP, and the connectionless-oriented transport layer communications protocol may be specifically the TCP and the SCTP.

The first acquiring unit 620 is configured to acquire, from the data packet, identification information of a data stream to which the data packet corresponding to the determined transport layer communications protocol belongs, where the identification information of the data stream is used to differentiate the data stream to which the data packet belongs.

If the transport layer communications protocol to which the data packet belongs is a connectionless-oriented transport layer communications protocol, the identification information of the data stream is a 2-tuple of the data packet, where the 2-tuple includes a destination IP address and port of the data packet, and the first acquiring unit 620 acquires the 2-tuple of the data packet from the data packet.

If the transport layer communications protocol to which the data packet belongs is a connection-oriented transport layer communications protocol, the identification information of the data stream is a 4-tuple of the data packet, where the 4-tuple includes a source IP address, a source port, a destination IP address, and a destination port of the data packet, and the first acquiring unit 620 acquires the 4-tuple of the data packet from the data packet.

The second acquiring unit 630 is configured to acquire, from the memory according to the correspondence between a transport layer communications protocol and an distribution table, an distribution table corresponding to the transport layer communications protocol to which the data packet belongs.

Optionally, as shown in FIG. 2, if the transport layer communications protocol to which the data packet belongs is a connectionless-oriented transport layer communications protocol, the distribution table includes a correspondence between a 2-tuple and a thread identifier, where each thread identifier corresponds to one thread, and the thread identifier may be an identity number ID of a thread, an address of a cache queue corresponding to a thread, or another identifier that can uniquely determine a thread.

Optionally, as shown in FIG. 3, if the transport layer communications protocol to which the data packet belongs is a connection-oriented transport layer communications protocol, the distribution table includes a first distribution table and a second distribution table. The first distribution table includes a correspondence between a 4-tuple and a thread identifier, where each thread identifier corresponds to one thread; the second distribution table includes a correspondence between a thread identifier and a destination IP address and port, where each thread identifier corresponds to one thread and a load of each thread. Multiple threads corresponding to a destination IP address and port are threads in different processes, so as to implement that threads in different processes are bound to a destination IP address and port of a same set. The thread identifier may be an identity number ID of a thread, an address of a cache queue corresponding to a thread, or another identifier that can uniquely determine a thread.

The determining unit 640 is configured to determine, according to the correspondence between identification information of a data stream and a thread in the distribution table corresponding to the transport layer communications protocol to which the data packet belongs, a thread corresponding to the data stream to which the data packet belongs.

Optionally, when the transport layer communications protocol to which the data packet belongs is a connectionless-oriented communications protocol, the thread corresponding to the data stream to which the data packet belongs is determined according to the distribution table shown in FIG. 2. The determining unit 640 is specifically configured to: search the correspondence between a 2-tuple and a thread identifier in the distribution table corresponding to the connectionless-oriented transport layer communications protocol to which the data packet belongs, for a thread identifier corresponding to the 2-tuple of the data packet; and determine a thread corresponding to the thread identifier that corresponds to the 2-tuple of the data packet as the thread corresponding to the data stream to which the data packet belongs.

Optionally, when the transport layer communications protocol to which the data packet belongs is a connection-oriented communications protocol, the thread corresponding to the data stream to which the data packet belongs is determined according to the distribution table shown in FIG. 3. The determining unit 640 is specifically configured to: search the correspondence between a 4-tuple and a thread identifier in the first distribution table corresponding to the connection-oriented transport layer communications protocol to which the data packet belongs, for a thread identifier corresponding to the 4-tuple of the data packet; if the thread identifier corresponding to the 4-tuple of the data packet exists in the first distribution table, determine a thread corresponding to the thread identifier that corresponds to the 4-tuple of the data packet as the thread corresponding to the data stream to which the data packet belongs; or if the thread identifier corresponding to the 4-tuple of the data packet does not exist in the first distribution table, search the correspondence between a thread identifier and a destination IP address and port in the second distribution table corresponding to the connection-oriented transport layer communications protocol to which the data packet belongs, for a thread identifier or thread identifiers corresponding to the destination IP address and port of the data packet; and determine a thread with a smallest load in a thread or threads corresponding to the thread identifier or thread identifiers that corresponds/correspond to the destination IP address and port of the data packet as the thread corresponding to the data stream to which the data packet belongs.

It can be learned from the distribution table shown in FIG. 3 that, each thread identifier in the second distribution table corresponds to a load of a thread corresponding to the thread identifier. If the destination IP address and port of the data packet correspond to only one thread identifier in the second distribution table of the distribution table shown in FIG. 4, a thread corresponding to the thread identifier is directly determined as the thread corresponding to the data stream to which the data packet belongs. If the destination IP address and port of the data packet correspond to multiple thread identifiers in the second distribution table of the distribution table shown in FIG. 3, a thread with a smallest load in threads corresponding to the multiple thread identifiers is determined as the thread corresponding to the data stream to which the data packet belongs, so as to implement load balancing among threads and make loads of a multi-core processor balanced.

The sending unit 650 is configured to send the data packet to a cache queue of the thread corresponding to the data stream to which the data packet belongs, so that the thread corresponding to the data stream acquires the data packet from the cache queue.

After the determining unit 640 determines, according to the distribution table, the thread corresponding to the data stream to which the data packet belongs, the sending unit 650 sends the data packet to the cache queue of the thread corresponding to the data stream to which the data packet belongs. Then the thread directly acquires the data packet from the cache queue corresponding to the thread; therefore, the data packet is not shared by multiple threads, which can avoid inter-thread exclusion and synchronization overheads, and avoid failure of an inter-core cache.

Figure 7:
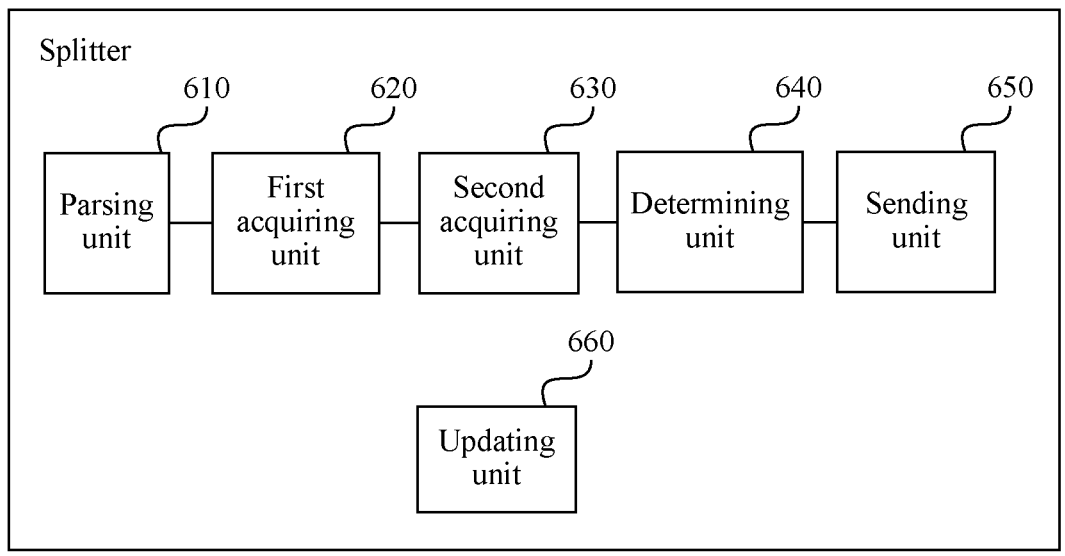
FIG. 7 is a schematic structural diagram of another splitter according to Embodiment 2 of the present disclosure.

In addition, as shown in FIG. 7, the splitter provided in Embodiment 2 of the present disclosure may further include an updating unit 660.

The updating unit 660 is configured to update the distribution table according to a state of a thread.

Specifically, for the distribution table shown in FIG. 2, when a thread establishes a connection, the updating unit 660 adds, to the distribution table, a thread identifier corresponding to the thread that establishes the connection, and a destination IP address and port corresponding to the thread. When a thread corresponding to a thread identifier in the distribution table changes from a connected state to an idle state (the idle state in this embodiment indicates that in a case in which a thread is not closed, a connected state of the thread is disabled, or a connected state of the thread is abnormally interrupted), the updating unit 660 deletes, from the distribution table, the thread identifier corresponding to the thread that changes from the connected state to the idle state, and a destination IP address and port corresponding to the thread.

For the distribution table shown in FIG. 3, when a thread corresponding to a thread identifier in the first distribution table changes from a connected state to a listening state, the updating unit 660 deletes, from the first distribution table, the thread identifier of the thread, and a source IP address, a source port, a destination IP address, and a destination port that correspond to the thread; and adds, to the second distribution table, the thread identifier of the thread, and the destination IP address and port corresponding to the thread, and a load of the thread. When a thread corresponding to a thread identifier in the second distribution table changes from a listening state to a connected state, the updating unit 660 deletes, from the second distribution table, the thread identifier of the thread, a destination IP address and port corresponding to the thread, and a load of the thread; and adds, to the first distribution table, the thread identifier of the thread, and a source IP address, a source port, the destination IP address, and the destination port that correspond to the thread. When a thread changes from an idle state to a listening state, the updating unit 660 adds, to the second distribution table, a thread identifier corresponding to the thread that changes from the idle state to the listening state, a destination IP address and port corresponding to the thread, and a load of the thread. When a thread corresponding to a thread identifier in the first distribution table or the second distribution table changes to an idle state, the updating unit 660 deletes, from the first distribution table, the thread identifier of the thread that changes to the idle state, and a source IP address, a source port, a destination IP address, and a destination port that correspond to the thread; or deletes, from the second distribution table, the thread identifier corresponding to the thread that changes to the idle state, a destination IP address and port corresponding to the thread, and a load of the thread.

According to the used splitter provided in Embodiment 2 of the present disclosure, the splitter uses a thread as an distribution granularity, and different transport layer communications protocols correspond to different distribution tables; the splitter allocates, according to an distribution table corresponding to a transport layer communications protocol to which a data packet belongs, the data packet to a cache queue of a thread corresponding to a data stream to which the data packet belongs, so that the thread acquires the data packet from the cache queue corresponding to the thread. Because each thread has its independent cache queue, the data packet and connection information of the data packet are not shared by multiple threads, which can avoid inter-thread exclusion and synchronization overheads, and avoid failure of an inter-core cache. In addition, for a connection-oriented transport layer communications protocol, it is implemented that multiple threads listen on a same port, which can effectively balance loads among multiple cores, and improve a processing capability of a multi-core processor.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:
1. A data distribution method, applied to a data distribution system, wherein the data distribution system comprises: a splitter, a memory, and multiple threads used for processing data, and each thread corresponds to a cache queue; the memory stores a correspondence between a transport layer communications protocol and a distribution table, and stores the distribution table corresponding to each transport layer communications protocol, and each distribution table is provided with a correspondence between identification information of a data stream and a thread in the multiple threads; and the data distribution method comprises:
- parsing, by the splitter, a received data packet to determine the transport layer communications protocol to which the data packet belongs;
- acquiring, by the splitter from the data packet, identification information of a data stream to which the data packet corresponding to the determined transport layer communications protocol belongs, wherein the identification information of the data stream is used to differentiate the data stream to which the data packet belongs;
- acquiring, by the splitter from the memory according to the correspondence between the transport layer communications protocol and the distribution table, the distribution table corresponding to the transport layer communications protocol to which the data packet belongs;
- determining, by the splitter according to the correspondence between identification information of the data stream and a thread in the distribution table corresponding to the transport layer communications protocol to which the data packet belongs, a thread corresponding to the data stream to which the data packet belongs; and
- sending, by the splitter, the data packet to a cache queue of the thread corresponding to the data stream to which the data packet belongs, so that the thread corresponding to the data stream to which the data packet belongs acquires the data packet from the cache queue.

2. The method according to claim 1, wherein if the transport layer communications protocol to which the data packet belongs is a connectionless-oriented transport layer communications protocol, the identification information of the data stream is a 2-tuple of the data packet, and the 2-tuple comprises a destination IP address and port of the data packet; and
the distribution table corresponding to the connectionless-oriented transport layer communications protocol comprises:
- a correspondence between a 2-tuple and a thread identifier, wherein each thread identifier corresponds to one thread.

3. The method according to claim 2, wherein the determining, by the splitter according to the correspondence between identification information of a data stream and a thread in the distribution table corresponding to the transport layer communications protocol to which the data packet belongs, a thread corresponding to the data stream to which the data packet belongs comprises:
- searching, by the splitter, the correspondence between a 2-tuple and a thread identifier in the distribution table corresponding to the connectionless-oriented transport layer communications protocol to which the data packet belongs, for a thread identifier corresponding to the 2-tuple of the data packet; and
- determining, by the splitter, a thread corresponding to the thread identifier that corresponds to the 2-tuple of the data packet as the thread corresponding to the data stream to which the data packet belongs.

4. The method according to claim 2, wherein the thread identifier is an address of a cache queue corresponding to a thread.

5. The method according to claim 1, wherein if the transport layer communications protocol to which the data packet belongs is a connection-oriented transport layer communications protocol, the identification information of the data stream is a 4-tuple of the data packet, and the 4-tuple comprises a source IP address, a source port, a destination IP address, and a destination port of the data packet;
the distribution table corresponding to the connection-oriented transport layer communications protocol comprises a first distribution table; and
the first distribution table comprises a correspondence between a 4-tuple and a thread identifier, wherein each thread identifier corresponds to one thread.

6. The method according to claim 5, wherein the determining, by the splitter according to the correspondence between identification information of a data stream and a thread in the distribution table corresponding to the transport layer communications protocol to which the data packet belongs, a thread corresponding to the data stream to which the data packet belongs comprises:
- searching, by the splitter, the correspondence between a 4-tuple and a thread identifier in the first distribution table corresponding to the connection-oriented transport layer communications protocol to which the data packet belongs, for a thread identifier corresponding to the 4-tuple of the data packet; and
- if the thread identifier corresponding to the 4-tuple of the data packet exists in the first distribution table, determining, by the splitter, a thread corresponding to the thread identifier that corresponds to the 4-tuple of the data packet as the thread corresponding to the data stream to which the data packet belongs.

7. The method according to claim 5, wherein the distribution table corresponding to the connection-oriented transport layer communications protocol comprises a second distribution table; the second distribution table comprises a correspondence between a thread identifier and a destination IP address and port; wherein each thread identifier corresponds to one thread and a load of each thread;
wherein the determining, by the splitter according to the correspondence between identification information of a data stream and a thread in the distribution table corresponding to the transport layer communications protocol to which the data packet belongs, a thread corresponding to the data stream to which the data packet belongs comprises:
- searching, by the splitter, the correspondence between a 4-tuple and a thread identifier in the first distribution table corresponding to the connection-oriented transport layer communications protocol to which the data packet belongs, for a thread identifier corresponding to the 4-tuple of the data packet;
- if the thread identifier corresponding to the 4-tuple of the data packet does not exist in the first distribution table, searching, by the splitter, the correspondence between a thread identifier and a destination IP address and port in the second distribution table corresponding to the connection-oriented transport layer communications protocol to which the data packet belongs, for a thread identifier or thread identifiers corresponding to the destination IP address and port of the data packet; and determining, by the splitter, a thread with a smallest load in a thread or threads corresponding to the thread identifier or thread identifiers that corresponds/correspond to the destination IP address and port of the data packet as the thread corresponding to the data stream to which the data packet belongs.

8. The method according to claim 5, wherein the thread identifier is an address of a cache queue corresponding to a thread.

9. The method according to claim 1, wherein the method further comprises:
updating, by the splitter, the distribution table according to a state of a thread.

10. A data distribution system, wherein the data distribution system comprises: a splitter, a memory and multiple threads used for processing data, and each thread corresponds to a cache queue; the memory stores a correspondence between a transport layer communications protocol and a distribution table, and stores the distribution table corresponding to each transport layer communications protocol, and each distribution table is provided with a correspondence between identification information of a data stream and a thread in the multiple threads; wherein the splitter is configured to:
parse a received data packet to determine the transport layer communications protocol to which the data packet belongs;
acquire, from the data packet, identification information of a data stream to which the data packet corresponding to the determined transport layer communications protocol belongs, wherein the identification information of the data stream is used to differentiate the data stream to which the data packet belongs;
acquire, from the memory according to the correspondence between the transport layer communications protocol and the distribution table, the distribution table corresponding to the transport layer communications protocol to which the data packet belongs;
determine, according to the correspondence between identification information of the data stream and a thread in the distribution table corresponding to the transport layer communications protocol to which the data packet belongs, a thread corresponding to the data stream to which the data packet belongs; and
send the data packet to a cache queue of the thread corresponding to the data stream to which the data packet belongs, so that the thread corresponding to the data stream to which the data packet belongs acquires the data packet from the cache queue.

11. The data distribution system according to claim 10, wherein if the transport layer communications protocol to which the data packet belongs is a connectionless-oriented transport layer communications protocol, the identification information of the data stream is a 2-tuple of the data packet, and the 2-tuple comprises a destination IP address and port of the data packet; and
the distribution table corresponding to the connectionless-oriented transport layer communications protocol comprises:
a correspondence between a 2-tuple and a thread identifier, wherein each thread identifier corresponds to one thread.

12. The data distribution system according to claim 11, wherein the splitter is further configured to:
search the correspondence between a 2-tuple and a thread identifier in the distribution table corresponding to the connectionless-oriented transport layer communications protocol to which the data packet belongs, for a thread identifier corresponding to the 2-tuple of the data packet; and
determine a thread corresponding to the thread identifier that corresponds to the 2-tuple of the data packet as the thread corresponding to the data stream to which the data packet belongs.

13. The data distribution system according to claim 11, wherein the thread identifier is an address of a cache queue corresponding to a thread.

14. The data distribution system according to claim 10, wherein the distribution table corresponding to a connection-oriented transport layer communications protocol comprises a first distribution table; and
the first distribution table comprises a correspondence between a 4-tuple and a thread identifier, wherein each thread identifier corresponds to one thread.

15. The data distribution system according to claim 14, wherein the splitter is further configured to:
search the correspondence between a 4-tuple and a thread identifier in the first distribution table corresponding to the connection-oriented transport layer communications protocol to which the data packet belongs, for a thread identifier corresponding to a 4-tuple of the data packet; and
if the thread identifier corresponding to the 4-tuple of the data packet exists in the first distribution table, determine a thread corresponding to the thread identifier that corresponds to the 4-tuple of the data packet as the thread corresponding to the data stream to which the data packet belongs.

16. The data distribution system according to claim 14, wherein the distribution table corresponding to a connection-oriented transport layer communications protocol comprises a second distribution table; the second distribution table comprises a correspondence between a thread identifier and a destination IP address and port, wherein each thread identifier corresponds to one thread and a load of each thread;
wherein the splitter is further configured to:
search the correspondence between a 4-tuple and a thread identifier in the first distribution table corresponding to the connection-oriented transport layer communications protocol to which the data packet belongs, for a thread identifier corresponding to a 4-tuple of the data packet;
if the thread identifier corresponding to the 4-tuple of the data packet does not exist in the first distribution table, search the correspondence between a thread identifier and a destination IP address and port in the second distribution table corresponding to the connection-oriented transport layer communications protocol to which the data packet belongs, for a thread identifier or thread identifiers corresponding to a destination IP address and port of the data packet; and
determine a thread with a smallest load in a thread or threads corresponding to the thread identifier or thread identifiers that corresponds/correspond to the destination IP address and port of the data packet as the thread corresponding to the data stream to which the data packet belongs.

17. The data distribution system according to claim 14, wherein the thread identifier is an address of a cache queue corresponding to a thread.

18. The data distribution system according to claim 10, wherein the splitter is further configured to update the distribution table according to a state of a thread.

\* \* \* \* \*